US012592858B2

(12) United States Patent
Maallem et al.

(10) Patent No.: US 12,592,858 B2
(45) Date of Patent: Mar. 31, 2026

(54) SMOOTH DISTRIBUTION OF DATASETS IN A MESH NETWORK

(71) Applicant: ITRON, INC., Liberty Lake, WA (US)

(72) Inventors: Khalid Maallem, Meudon (FR);
Jérôme Bartier, Edinburgh (GB);
Fabrice Monier, Bry sur Marne (FR);
Samuel De Vals, Louveciennes (FR)

(73) Assignee: ITRON, INC., Liberty Lake, WA (US)

( * ) Notice: Subject to any disclaimer, the term of this patent is extended or adjusted under 35 U.S.C. 154(b) by 22 days.

(21) Appl. No.: 18/159,018

(22) Filed: Jan. 24, 2023

(65) Prior Publication Data

US 2024/0250880 A1      Jul. 25, 2024

(51) Int. Cl.
| | |
|---|---|
| *G06F 15/16* | (2006.01) |
| *H04L 41/12* | (2022.01) |
| *H04W 40/02* | (2009.01) |

(52) U.S. Cl.
CPC ............. *H04L 41/12* (2013.01); *H04W 40/02* (2013.01)

(58) Field of Classification Search
CPC ............................... H04L 41/12; H04W 40/02
USPC .......................................................... 709/226
See application file for complete search history.

(56) References Cited

U.S. PATENT DOCUMENTS

| | | | | |
|---|---|---|---|---|
| 8,619,576 | B2 * | 12/2013 | Vasseur ................... | H04L 47/12 370/252 |
| 8,902,903 | B2 * | 12/2014 | Palchaudhuri .... | H04W 72/0446 370/406 |
| 9,628,338 | B2 * | 4/2017 | Turon ..................... | H04W 4/80 |
| 9,876,679 | B2 * | 1/2018 | Liu ...................... | H04L 41/0846 |
| 10,057,123 | B1 * | 8/2018 | Knight ................... | H04L 45/02 |
| 10,291,698 | B2 * | 5/2019 | Hulick ................ | H01Q 9/0414 |
| 10,523,247 | B2 * | 12/2019 | Gopalakrishnan ... | H01Q 21/205 |
| 10,924,589 | B2 * | 2/2021 | De Smet ................ | H04L 67/34 |
| 11,012,853 | B2 * | 5/2021 | Donahue .................. | G06F 8/65 |
| 11,368,173 | B2 * | 6/2022 | Gopalakrishnan ... | H01Q 19/106 |

(Continued)

FOREIGN PATENT DOCUMENTS

| | | | | | |
|---|---|---|---|---|---|
| JP | 2018137516 | A | * | 8/2018 | ............. H04L 41/12 |

OTHER PUBLICATIONS

U.S. patent application entitled, "Peer Selection for Data Distribution in a Mesh Network", U.S. Appl. No. 17/527,070, filed Nov. 15, 2021, 55 pages.

(Continued)

*Primary Examiner* — Moustafa M Meky
(74) *Attorney, Agent, or Firm* — Artegis Law Group, LLP

(57) ABSTRACT

Various embodiments disclosed herein provide communication techniques for transferring datasets in a mesh network. In various embodiments, a method includes transmitting, by a server computing device controlling a mesh network, a dataset to a first node in the mesh network; transmitting, by the server computing device, first notifications to respective second nodes that are neighbors to the first node in the mesh network, the first notifications informing the respective second nodes that the dataset is available for download; and in response to determining that a third node from the respective second nodes has received the dataset, transmitting, by the server computing device, second notifications to respective fourth nodes that are neighbors to the first node in the mesh network or are neighbors to the third node in the mesh network, the second notifications informing the respective fourth nodes that the dataset is available for download.

20 Claims, 10 Drawing Sheets

(56) References Cited

U.S. PATENT DOCUMENTS

| | | | | |
|---|---|---|---|---|
| 11,575,739 B1* | 2/2023 | Jamil | ..................... | H04L 67/1074 |
| 11,743,713 B2* | 8/2023 | Donahue | ............... | H04W 8/245 |
| | | | | 455/419 |
| 11,876,676 B2* | 1/2024 | De Smet | ............... | H04L 41/082 |
| 2007/0280165 A1* | 12/2007 | Doshi | ..................... | H04L 41/22 |
| | | | | 370/331 |
| 2009/0219941 A1* | 9/2009 | Cardozo | ................. | H04L 12/42 |
| | | | | 370/406 |
| 2013/0121337 A1 | 5/2013 | Nguyen et al. | | |
| 2015/0092535 A1* | 4/2015 | Kelsey | ..................... | H04L 41/12 |
| | | | | 370/218 |
| 2017/0339653 A1* | 11/2017 | Hui | .................... | H04W 56/0065 |
| 2020/0059538 A1* | 2/2020 | De Smet | ................. | H04L 67/34 |
| 2020/0162892 A1* | 5/2020 | Donahue | ................. | H04L 45/02 |
| 2021/0119858 A1* | 4/2021 | De Smet | .................... | G06F 8/61 |
| 2021/0133202 A1 | 5/2021 | Fry | | |
| 2021/0274341 A1* | 9/2021 | Donahue | ............... | H04W 8/245 |
| 2023/0156077 A1* | 5/2023 | Jamil | ................. | H04L 67/1008 |
| | | | | 709/201 |
| 2023/0254216 A1* | 8/2023 | Griffin | .................... | H04L 41/12 |
| | | | | 370/254 |
| 2023/0269166 A1* | 8/2023 | Griffin | ................. | H04W 40/24 |
| | | | | 709/238 |
| 2023/0388186 A1* | 11/2023 | Griffin | .................... | H04L 61/45 |

OTHER PUBLICATIONS

Non Final Office Action received for U.S. Appl. No. 17/527,070 dated May 26, 2022, 13 pages.
International Search Report for Application No. PCT/US2022/049572 dated Dec. 29, 2022.
Notice of Allowance received for U.S. Appl. No. 17/527,070 dated Oct. 3, 2022, 8 pages.
Notice of Allowance received for U.S. Appl. No. 18/151,102 dated Dec. 18, 2023, 18 pages.
Notice of Allowance received for U.S. Appl. No. 18/631,348 dated Oct. 15, 2024, 24 pages.

* cited by examiner

Figures 3A, 3B:
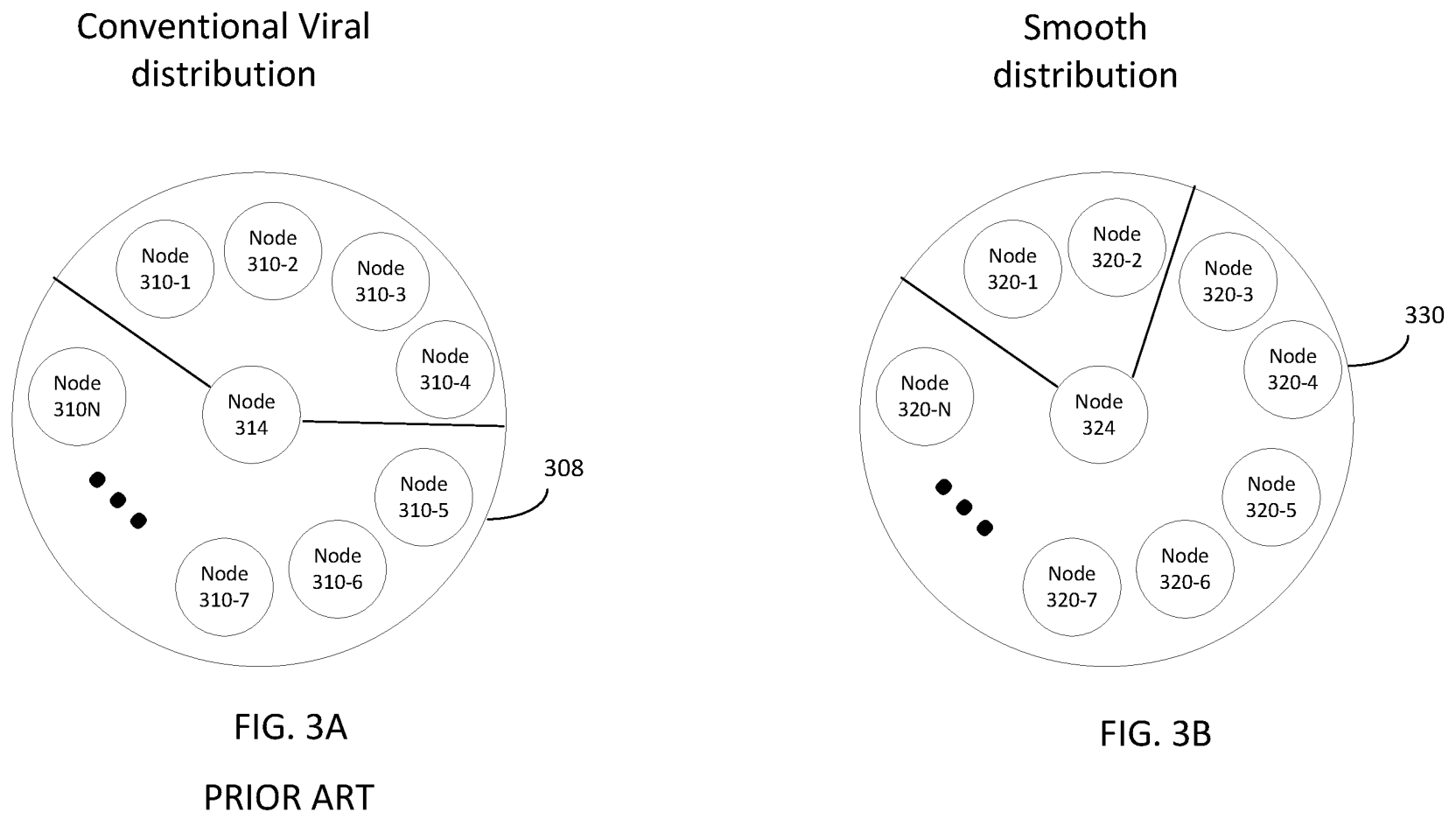

Smooth distribution

Node 320-3
Node 320-4
Node 320-5
Node 320-6
Node 320-2
Node 324
Node 320-1
Node 320-7
Node 320-N

Conventional Viral distribution

Node 310-3
Node 310-4
Node 310-5
Node 310-6
Node 310-2
Node 314
Node 310-1
Node 310-7
Node 310N

PRIOR ART

Conventional viral distribution (maximum bandwidth for each floating node is 4)

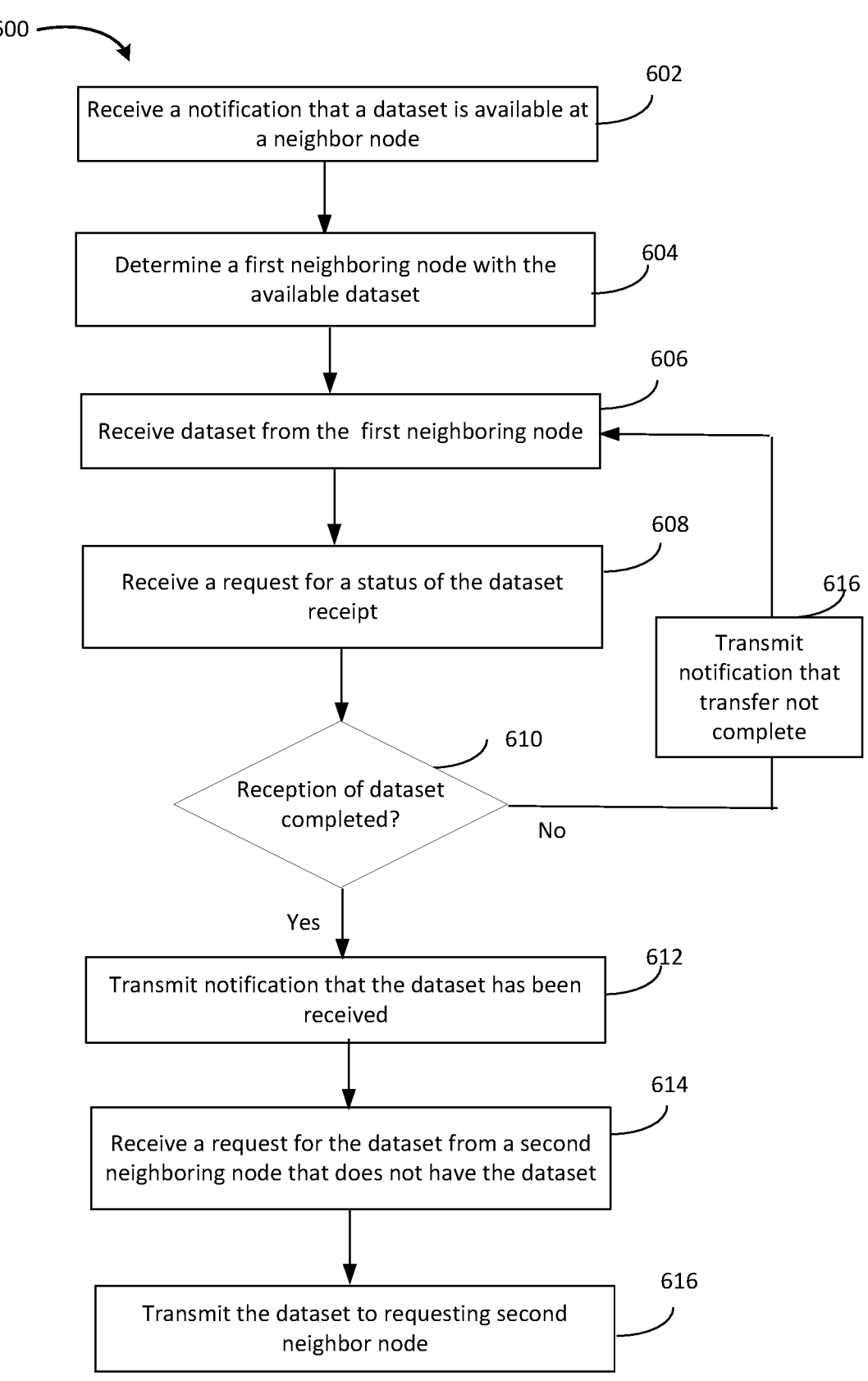

600

602
Receive a notification that a dataset is available at a neighbor node

604
Determine a first neighboring node with the available dataset

606
Receive dataset from the first neighboring node

608
Receive a request for a status of the dataset receipt

610
Reception of dataset completed?

616
Transmit notification that transfer not complete

No

Yes

612
Transmit notification that the dataset has been received

614
Receive a request for the dataset from a second neighboring node that does not have the dataset 616
Transmit the dataset to requesting second neighbor node

FIG. 6

SMOOTH DISTRIBUTION OF DATASETS IN A MESH NETWORK

BACKGROUND

Field of the Various Embodiments

The various embodiments relate generally to mesh networks, and more specifically, to a communication technique for smoothly distributing datasets to the nodes in a mesh network.

Description of the Related Art

In mesh networks, one or more nodes communicate using one more communication media, such as various wired connections (e.g., Ethernet, power line communication (PLC), or the like) and/or wireless connections (e.g., WiFi®, Bluetooth®, radiofrequency (RF) communication, or the like). Many such mesh networks are self-organized as peer-to-peer networks, in which connections are established in response to the nodes discovering one another rather than based on a predefined topology or a centralized server. In addition, certain communications (e.g., firmware or configuration upgrades) often need to be transmitted to nodes in the network.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3A illustrates an exemplary cluster in a mesh network in which datasets are distributed using a conventional viral distribution method;

FIG. 3B illustrates an exemplary cluster in a mesh network in which datasets are distributed using a smooth distribution method, according to one or more aspects of the various embodiments;

FIG. 6 illustrates a flow diagram of method steps for receiving a dataset by a node in a mesh network, according to one or more aspects of the various embodiments

DETAILED DESCRIPTION

Figure 1:
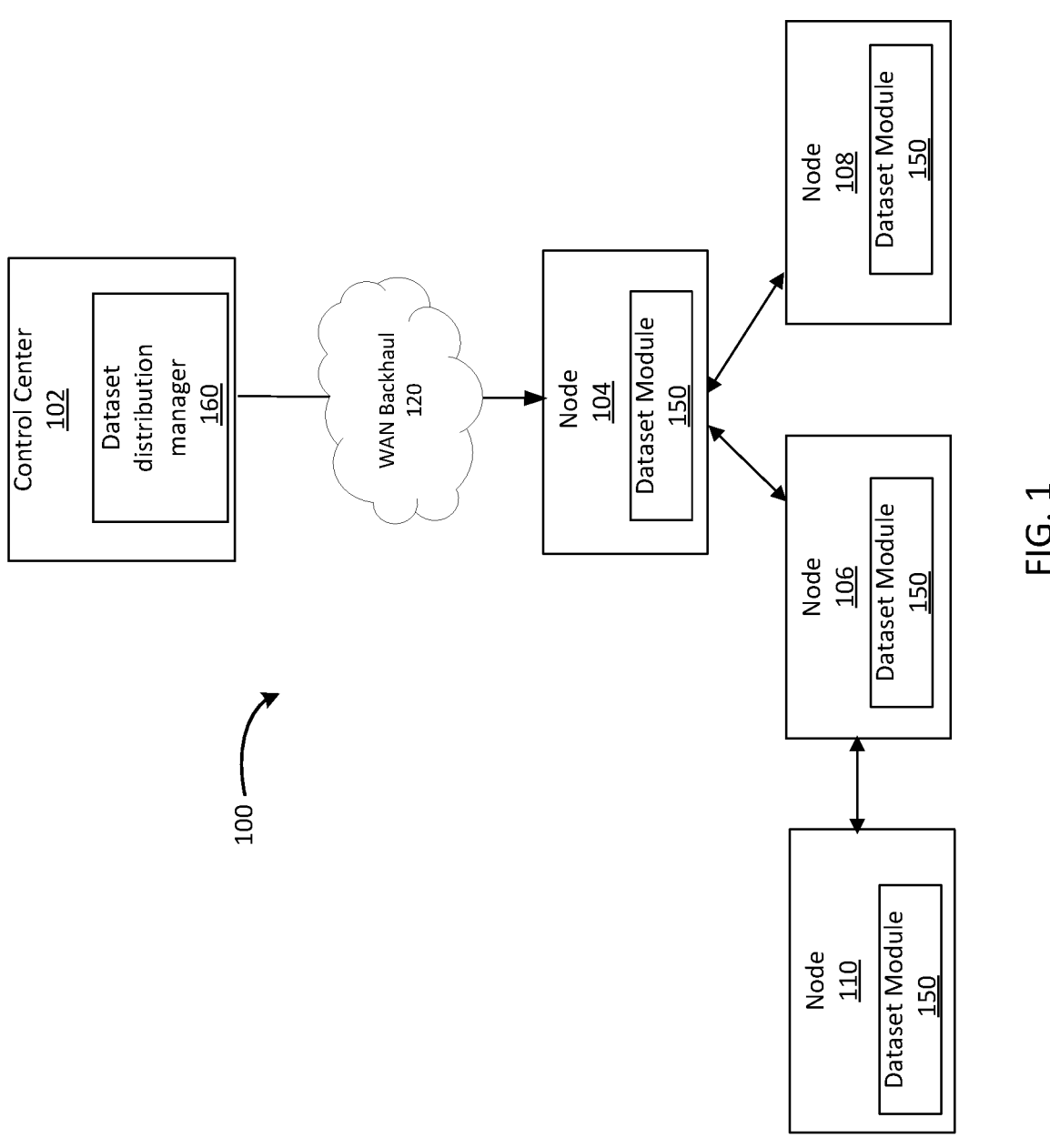
FIG. 1 illustrates a block diagram of a computer system, according to one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

In a mesh network, nodes of the mesh network can transmit messages to other nodes in the mesh network. In certain circumstances, a common dataset (e.g., a firmware image or update file) may need to be sent to all the nodes or a group of nodes in the mesh network. For example, in an infrastructure including electricity meters, gas meters, and the like that measure commodities supplied to various clients, a firmware update may need to be sent to update the firmware on the electricity meters. Other types of equipment that may require firmware updates include backbone infrastructure, smart meters, etc. One approach to distributing the dataset uses a conventional viral distribution process.

Such a conventional viral distribution process includes a "seeding" phase, in which a back office associated with the mesh network (such as control center or other server) selects one or more nodes of the mesh network and transmits (or "seeds") the dataset (e.g., firmware image or update file) thereto. The seeding phase results in a set of "initially seeded" nodes in the mesh network, where an initially seeded node (also referred to herein as a "seeded node") is a node that receives the dataset directly from the back office (or control center). Once a node receives and contains a complete copy of the dataset it can be referred to as a "source node". A source node can either be an "initially seeded" node, as explained, where the node receives the dataset from the back office directly or it can be an indirectly seeded node, where it receives the dataset from a neighboring node.

Following the initial seeding of a select number of nodes, a notification is then propagated throughout the mesh network from the back office indicating that the other nodes of the network should attempt to acquire a dataset (e.g., a firmware image or update file) from neighbor nodes. The process of the back office indicating to a node that a dataset is available to be acquired from a neighboring node is sometimes referred to as "request to float" a node and the node informed about the dataset availability at a neighboring node is referred to as a "floating node." A floating node finds and downloads the dataset from a neighboring node, which can either be an initially seeded node or an indirectly seeded node that receives the dataset and thereafter becomes a source node. Once the nodes in the mesh network are floated based on the instruction received from the back office, viral distribution of the dataset (e.g., as a firmware image or update file) proceeds throughout the mesh network.

Because a firmware image file can be relatively large, the transmission of such a file from one node device to another within a mesh network can occur over a significant time interval and consume a considerable amount of bandwidth. In a typical viral distribution process, the nodes instructed to request the dataset from neighboring nodes (or floating nodes) can initiate requests for the dataset from the relatively fewer number of source nodes at substantially the same time. The source nodes, however, have a limited amount of bandwidth or can serve only a limited number of nodes at a time. As a result, only a few of the numerous dataset requests received by each source node can be serviced. Meanwhile, nodes that are unable to receive the dataset from a source node within a given duration of time can time out eventually and may ultimately need to be seeded by the back office.

While the conventional viral distribution process is more efficient than transmitting the dataset directly from the back office to each of the nodes in the mesh network, there are drawbacks to the viral distribution process. One drawback with the conventional viral distribution process is that the viral distribution process increases the amount of network traffic and consumes significant levels of power. For example, in the conventional viral approach, performance of the mesh network can get throttled by nodes transmitting requests to source nodes that will not get serviced (or will not receive responses) because the bandwidth of the source nodes is already occupied servicing other requests. The mesh network, as a result, experiences performance degradation for both the dataset transmission and other unrelated traffic in the network. Further, a source node operating at maximum capacity can consume a considerable amount of time servicing multiple requests in parallel because each request has a limited amount of bandwidth available to servicing the request. Also, additional latency is introduced in the network by the back office separately seeding nodes that have timed out after they are unable to establish contact with a busy source node. As a result, the conventional viral distribution process can take a considerably long period of time to transmit the dataset to the intended nodes in the mesh network. Generating extraneous requests also results in additional power consumption by the nodes generating the requests. Such an increase in power consumption can be particularly impactful to battery-powered devices as it causes batteries to be depleted at an increased rate. Further, even for non-battery powered devices, an increase in power consumption is undesirable.

As discussed below, a solution to the above problems is to use a smooth distribution process for sending datasets (e.g., firmware image or update file, configuration data for devices corresponding to the nodes, etc.) in a mesh network. The smooth distribution process is a type of viral process with significant speed and efficiency improvements over the conventional viral distribution process. The process includes, a back office (such as control center 930 in FIG. 9), seeding one or more first nodes with the dataset (e.g., a firmware image or update file, configuration data for devices corresponding to the nodes, etc.) and floating a limited number of second nodes, which are neighbors to at least one of the one or more first nodes, that can request the dataset from the seeded one or more first nodes by transmitting notification of the availability of the dataset to the second nodes. The maximum number of nodes that can be floated for a given seeded or source node is determined based on optimization criteria including one or more factors (e.g., knowledge of float throughput of devices implementing the nodes in the network, number of neighbors that can be served simultaneously by a source node, etc.) The optimization process optimizes an amount of time it takes to distribute the dataset, a number of requests that can be transmitted to a given source node at any given time, an amount of power consumed to distribute the dataset, and/or any combination of thereof. In some embodiments, the optimization process determines the maximum number of nodes that can be floated by using modeling. empirical data. or a hybrid of both. Both the generation of the empirical data and the modeling leverage a known configuration of the deployment. In some embodiments, the optimization process can be dynamic and based on the knowledge the back office has regarding the performance of the network.

The smooth distribution process further includes waiting a set amount of time and determining whether the floated second nodes have received the dataset. In response to determining that one or more of the floated second nodes have received the dataset, the process includes floating additional nodes in the mesh network. The additional nodes include at least a number of nodes neighboring each of the second nodes that have received the dataset (and can now act as source nodes) and a number of nodes neighboring the first node (which have not already been seeded with the dataset). As noted above, the number of additional nodes floated for each source node is limited to the maximum number determined based on the optimization criteria.

At least one technical advantage of the disclosed techniques is that the disclosed techniques reduce the amount of network traffic and improve network performance. Instead of allowing an unlimited number of nodes to transmit requests to source nodes, a maximum number of neighboring nodes are floated for each source node, thereby, constraining the number of requests that a source node can receive. This not only reduces the number of requests per node but also reduces traffic throughout the network. Further, constraining the number of requests received per node reduces bandwidth usage in the network, thereby, improving network performance for both dataset transmission and other applications using the network. Floating a maximum number of nodes for a given source node also prevents nodes from making unnecessary requests and reduces the amount of power that is consumed by devices implementing the nodes in the network.

Another technical advantage of the disclosed techniques is that, with the disclosed techniques, the total amount of time to transmit the dataset to all (or substantially all) the nodes in the network is considerably reduced. Because the number of floating nodes per source d node is capped at a maximum number, each node has access to a higher amount of bandwidth from a respective source node and can receive the dataset at a much faster rate as compared to a conventional viral distribution process. Transmitting the dataset to each node at a higher rate also frees up the source node earlier for other transmissions and improves seed node availability. Improving source node availability avoids unnecessary time-outs and precludes the need for the back office to seed nodes directly. As a result, the entire distribution process is accelerated and also experiences fewer time-outs.

SMOOTH DISTRIBUTION OF DATASETS

Referring now to FIG. 1, a block diagram of a computer system 100 is shown. In various embodiments, computer system 100 includes, without limitation, a control center 102, a wide area network (WAN) backhaul 120, a node 104, a node 106, a node 108, and a node 110. As discussed in additional detail in reference to FIG. 2, in various embodiments nodes 104, 106, 108, and 110 are nodes of a mesh network that are operable to communicate with each other and other nodes in the mesh network. Control center 102, also referred to above as the back office, is configured to coordinate the operations of a network that includes nodes

104, 106, 108, and 110. In various embodiments, smooth transmission of datasets is implemented by the control center 102 acting in concert with the one or more nodes 104, 106, 108, and 110 in the network. Smooth distribution refers to a process whereby which one or more nodes are initially seeded with a dataset and subsequently a notification of dataset availability is sent to a limited number of nodes neighboring the initially seeded nodes, and, as each node receives a copy of the dataset, a limited number of additional nodes are sent notifications of the dataset availability. The number of nodes that are sent the notification depends on an optimization criteria.

When control center 102 wants to transmit a dataset to nodes 104, 106, 108 and 110 in the mesh network, control center 102 prepares one or more messages containing the dataset (e.g., a portion of or a complete firmware image file, configuration data for devices corresponding to the nodes, etc.) and seeds node 104 by transmitting the dataset across WAN backhaul 120 to node 104. Once the dataset is available at seeded node 104, the control center 102 also transmits a notification of dataset availability (also known as "request to float" a node at noted above) to node 106. Node 106 can be one of a maximum number of nodes that can request the dataset from a neighboring source node, for example, node 104. The maximum number of nodes that can be floated for a given source node can be determined based on optimization criteria including one or more factors (e.g., knowledge of float throughput, such as a chunk rate, of devices implementing the nodes in the network, number of neighbors that can be served contemporaneously by a source node, knowledge regarding other network traffic being handled by the source node or the neighbor nodes, interference detected in the mesh network, various interruptions in the dataset distribution process, etc.). In some embodiments, the maximum number of nodes that can be floated for a given source node varies by the source node. In some embodiments, the maximum number of nodes that can be floated by a for a given source node is determined using modeling, empirical data, or a hybrid of both. In some embodiments, the maximum number of nodes that can be floated for a given source node is determined dynamically when a decision is made regarding the number of nodes to float for the given source node. Thereafter, control center 102 waits for a set amount of time and performs a status check to determine whether node 106 received the dataset. In response to determining that node 106 has received the dataset, control center 102 transmits a notification of dataset availability to nodes 108 and 110 in the mesh network. When the transmission from node 104 to 106 is complete, bandwidth on node 104 is freed up and, accordingly, control center floats node 108 so that node 108 can request the dataset from a neighboring source node, for example, node 104. Node 108 can be one of a maximum number of nodes that can request the dataset from node 104. When the transmission from node 104 to 106 is complete, node 106 can act as a source node and, therefore, control center floats node 110 so that node 110 can request the dataset from a neighboring source node, for example, node 106. Node 110 can be one of a maximum number of nodes that can request the dataset from node 106.

According to the techniques discussed below in further detail in reference to FIG. 2, nodes 104, 106, 108 and 110 are able to receive, process and transmit datasets from the control center 102 and other nodes using a dataset module 150. Further, control center 102 is able to communicate with other nodes in the mesh network including transmitting messages with a portion of a dataset (e.g., with a portion of a firmware image) or the complete dataset using a dataset distribution manager 160. In some embodiments, the dataset distribution manager 160 transmits a portion of the dataset or the complete dataset to the dataset module 150 of each node using unicast messaging.

Figure 2:
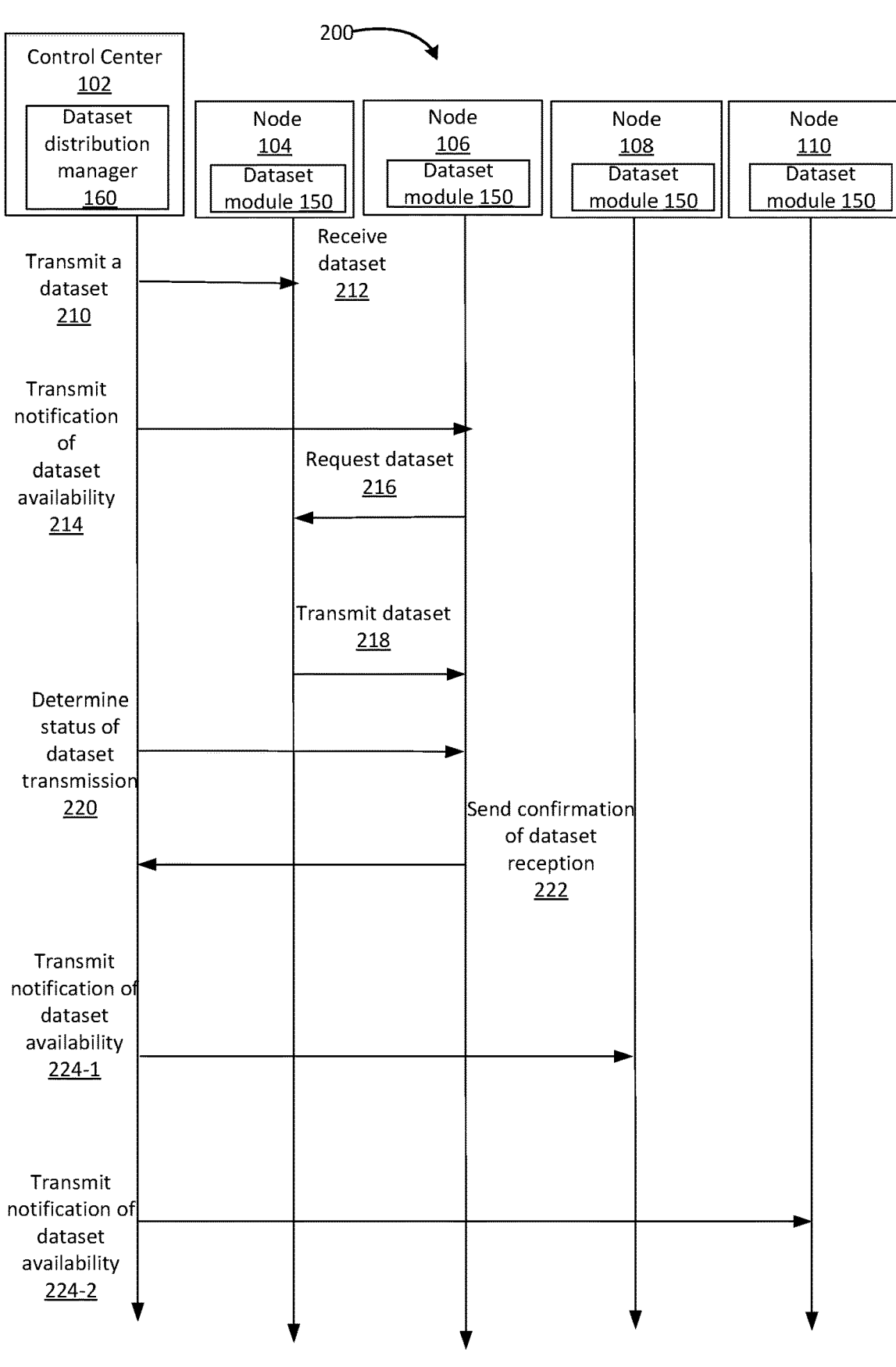
FIG. 2 illustrates an example flow diagram showing a process 200 for a smooth distribution of a dataset in a mesh network, according to one or more aspects of the various embodiments.

FIG. 2 illustrates an example flow diagram showing a process 200 for a smooth distribution of a dataset in a mesh network, according to one or more aspects of the various embodiments. Although the interactions between the nodes in a mesh network are shown in an order, persons skilled in the art will understand that the interactions may be performed in a different order, interactions may be repeated or skipped, and/or may be performed by components other than those described in FIG. 1.

As shown in FIG. 2, control center 102 and nodes 104, 106, 108, and 110 of a mesh network are connected by a communication medium (not shown). The communication medium can be, for example, a wired connection (e.g., an Ethernet connection or a power line communication connection) or a wireless connection (e.g., a Wi-Fi connection, a Bluetooth connection, or any other type of wireless connection). The connection can be part of a WAN backhaul (e.g., WAN backhaul 120 in FIG. 1). Although not shown, the control center 102 and nodes 104, 106, 108 and 110 can be in communication with other nodes of the mesh network (not shown) by the same communication medium or different communication media. In some embodiments, the control center 102 and nodes 104, 106, 108 and 110 communicate with each other using unicast messaging.

Nodes 104, 106, 108 and 110 are configured to execute a dataset module 150, which could, for example, be a software application. Dataset module 150 performs functions such as (without limitation) transmitting, receiving, encrypting and/or decrypting communications (e.g., datasets) to/from the control center 102 and other nodes (e.g., with each other). Further, dataset module 150 enables nodes to receive notifications of dataset availability from the control center 102 and to communicate status notifications regarding dataset transmissions with the control center 102. Control center 102 is configured to execute a dataset distribution manager 160, which could, for example, be a software application. The dataset distribution manager 160 performs functions such as (without limitation) transmitting, receiving, encrypting and/or decrypting communications to/from the nodes in the mesh network. In some embodiments, dataset distribution manager 160 separates a dataset into multiple blocks of data (sometimes referred to as "chunks") and transmit the chunks to nodes in the mesh network using unicast messaging or other type of one-to-one transmission technique.

As shown, process 200 begins at step 210, in which, using dataset distribution manager 160, control center 102 transmits a dataset (e.g., a firmware image or a portion thereof) to node 104 using, for example, a unicast service. The transmission process can be part of a seeding phase in which the control center 102 selects one or more nodes (e.g., node 104) of the mesh network and seeds the one or more nodes with the dataset.

In some embodiments, node 104 is located at any point in the hierarchy of the mesh network. While the control center 102 is capable of managing thousands or millions of nodes, the control center 102 typically manages a dataset transmission process (e.g., a firmware download process) per cluster, where a cluster is a group of nodes that has network connectivity between each other, where the network connectivity can be either directly or indirectly through the use of intermediate nodes. In some embodiments, a cluster is a group of nodes that communicates to the mesh network through an access point. The control center 102, in some embodiments, manages each cluster independently. A cluster can, for example, include as few as a hundred nodes or as many as thousands of nodes. In some embodiments, node 104 is the root node of a cluster, while, in other embodiments, node 104 can be one of the nodes lower in the hierarchy within the cluster. In some embodiments, the seed nodes during the seeding phase are randomly selected. Alternatively, in other embodiments, the selection process to seed nodes can be determined based on an optimization process (e.g., an optimization process that takes into account the topology of the cluster). In some embodiments, a fixed percentage of nodes in each cluster are seeded during the seeding phase for the smooth distribution process.

At step 212, node 104 receives the dataset from the control center 102. In some embodiments, using the dataset module 150, a device corresponding to node 104 processes the contents of the packet containing the dataset received from the control center 102. Once control center 102 has transmitted the dataset to node 104, node 104 becomes a source node.

At step 214, the control center 102 transmits a notification of dataset availability to node 106, which is a neighboring node of node 104 (as shown in FIG. 1). In some embodiments, the notification from the control center 102 is a command instructing node 106 to retrieve the dataset from a neighboring node. As explained previously, the process of the control center 102 indicating to a node that a dataset is available to be acquired from a neighboring node is sometimes referred to as "request to float" a node and the node informed about the dataset availability at a neighboring node is referred to herein as a "floating node." A floating node finds and downloads the dataset from a neighboring node, which can either be a seeded node or a previously floated node, which receives the dataset and thereafter becomes a source node. A dataset module 150 at floating node 106 initiates a process at node 106 whereby node 106 attempts to contact a neighboring node with the dataset to request the dataset from the neighboring node.

Figure 7:
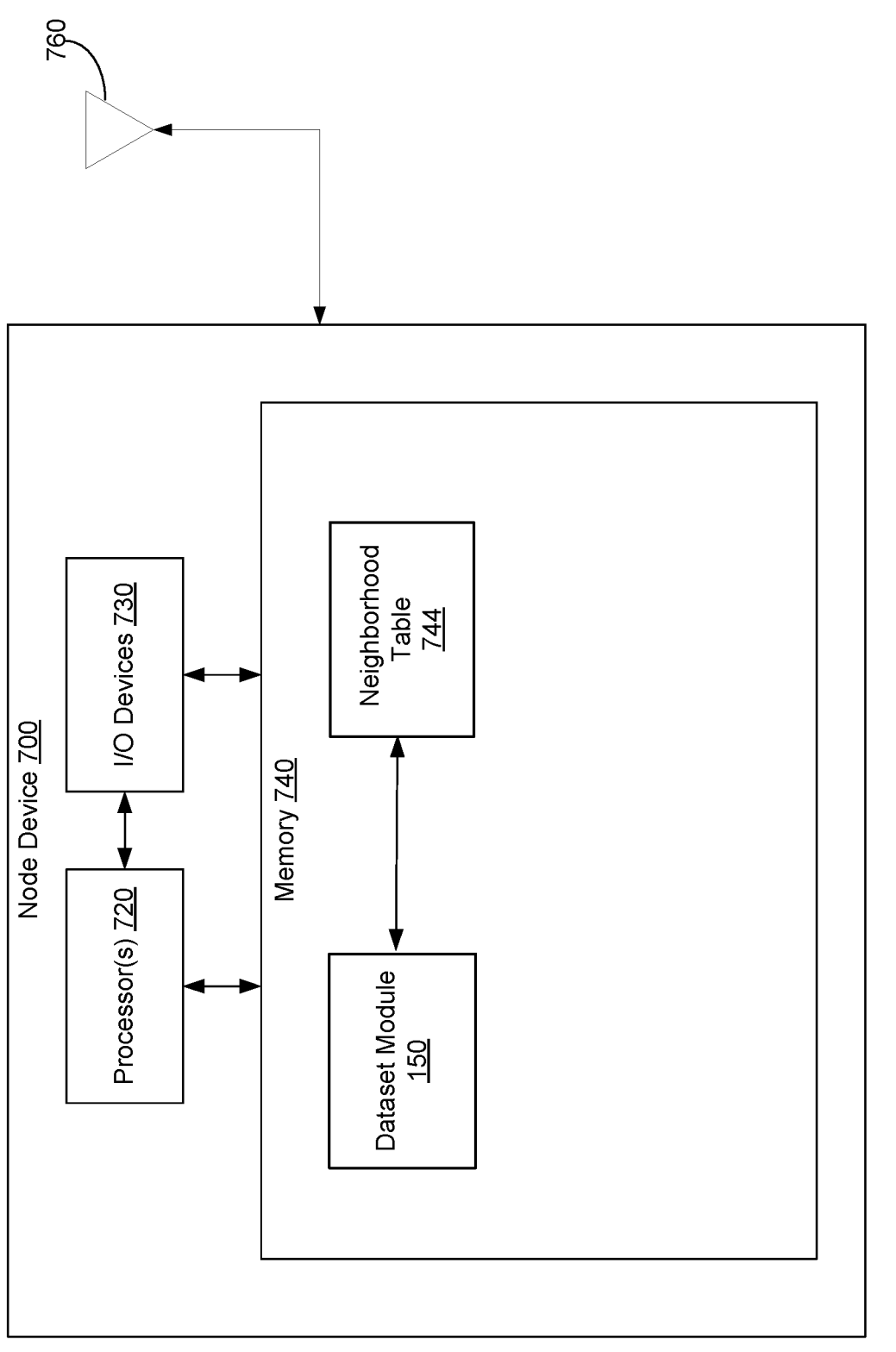
FIG. 7 illustrates an exemplary node 700 that can be included in a mesh network and which is configured to implement one or more aspects of the various embodiments.

In some embodiments, the control center 102 does not contain instructions requiring node 106 to receive the dataset from any particular source node. As a result, node 106 can contact any of the neighboring source nodes to request the dataset. For example, node 106 can download the dataset from node 104, which is a neighboring source node. In some embodiments, information regarding neighboring nodes is maintained at each node in the form of a neighborhood table, which comprises a list of addresses or other identifiers for the neighboring nodes. In some embodiments, each node stores and updates its own copy of the neighborhood table (e, as shown in FIG. 7 described below).

Figure 8:
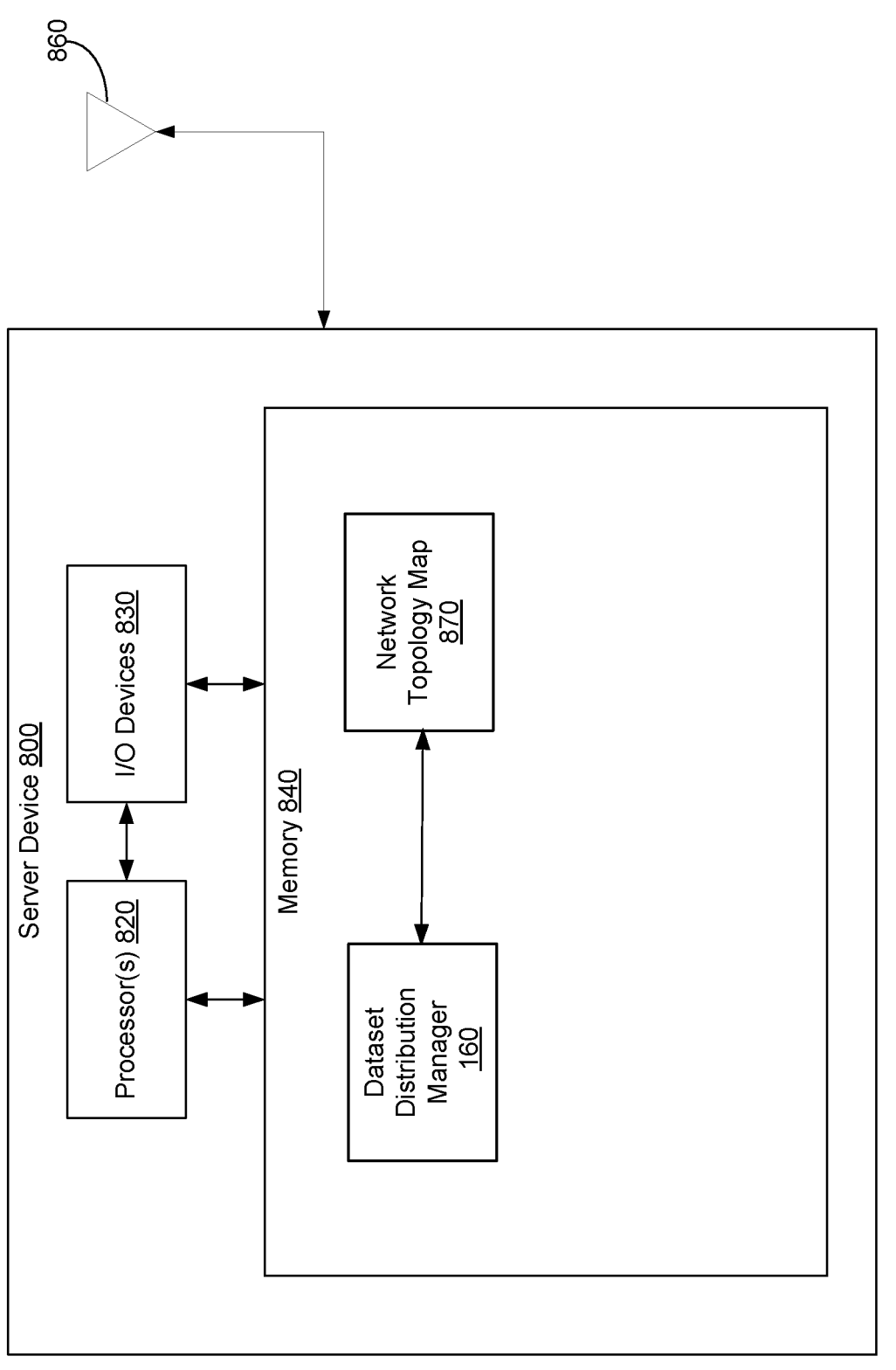
FIG. 8 illustrates an exemplary server device 800 that can be included in a mesh network and which is configured to implement one or more aspects of the various embodiments.

In some embodiments, the dataset distribution manager 160 at control center 102 has access to a topology map of the entire network (e.g., as shown in FIG. 8 described below). Using this topology map, the dataset distribution manager 160 is able to determine neighboring nodes to any source node. Accordingly, in order to transmit a request to float node 106, the control center 102 has to access the topology map to determine neighboring nodes to node 104 that are not as yet sourced.

At step 216, accordingly, the dataset module 150 at node 106 requests the dataset from node 104. Because the dataset distribution manager 160 has a limit on the number of nodes the dataset distribution manager 160 can request to float for each source node, node 106 will typically receive the available bandwidth from node 104 to service the request without needing to compete with other nodes. At step 218, node 104 transmits the dataset to node 106.

After a period of time has elapsed, at step 220, the dataset distribution manager 160 determines the status of the dataset download at node 106. In some embodiments, the dataset distribution manager 160 performs a status check on each of the floating nodes neighboring source node 104.

At step 222, the dataset module 150 at node 106 transmits a confirmation of dataset reception back to the control center 102. Because the dataset distribution manager 160 has access to a network topology map, the dataset distribution manager can determine which other nodes in the network can be sent a request to float in response to node 106 receiving the dataset and becoming a source node. For example, the dataset distribution manager 160 can determine that node 104 has a communication channel that is now available because the transmission of the dataset from node 104 to node 106 is complete. Further, the dataset distribution manager 160 can determine that because the transmission to node 106 is complete, node 106 can be regarded as a source node and additional nodes neighboring node 106 can be sent a request to float.

At step 224-1, the dataset distribution manager 160 transmits a notification of dataset availability to node 108. When the transmission from node 104 to 106 is complete at step 218, bandwidth on node 104 is freed up and, accordingly, the dataset distribution manager 160 requests to float node 108 so that node 108 can download the dataset from a neighboring source node, for example, node 104. As noted previously, node 108 can be one of a determined maximum number of nodes that can request the dataset from node 104, where the maximum number is determined based on any of the optimization criteria discussed above and/or any of the techniques discussed above.

Also, at step 224-2, the dataset distribution manager 160 transmits a notification of dataset availability to node 110. Node 106 is a source node after the transmission at step 218 and, therefore, the dataset distribution manager 160 can request to float node 110 so that node 110 can request the dataset from a neighboring source node, for example, node 106. Node 110 can be one of a determined maximum number of nodes that can request the dataset from node 106.

Each time a node is sourced by receiving a dataset from a neighboring node, additional nodes can be requested to float by the dataset distribution manager 160 that neighbor the source nodes. This process continues until the dataset is distributed to all the nodes in a cluster. The same process can also be carried out for all the clusters in the mesh network.

FIG. 3A illustrates an exemplary cluster in a mesh network in which datasets are distributed using a conventional viral distribution method. As shown in FIG. 3A, a cluster 308 in a mesh network comprises a source node 314 and an N number of nodes neighboring the source node, for example, nodes 310-1 to 310-N. After node 314 receives the dataset (from the back office or from a neighboring node), a notification is then propagated throughout the mesh network from the back office indicating that each node 310 of the network should attempt to acquire a dataset (e.g., a firmware image or update file) from neighbor nodes. Accordingly, each of the neighboring nodes 310-1 to 310-N can try to request the dataset from a neighboring node. As explained above, source node 314 has limited bandwidth and cannot support a request from all its neighboring nodes. However, in conventional viral distribution, source node 314 can attempt to share bandwidth between various neighboring nodes supporting requests from as many neighboring nodes as the source node is able to (e.g., nodes 310-1 to 310-4 as shown in FIG. 3A). Fully utilizing all its communication channels can significantly impact the source node and slow down a transmission speed to each of the neighboring nodes the source node is servicing. Also, receiving recurring requests from one or more additional neighboring nodes that the source node does not have bandwidth for can add additional load to the node. The problems associated with a conventional viral distribution method are addressed by the smooth distribution process shown in FIG. 3B.

FIG. 3B illustrates an exemplary cluster in a mesh network in which datasets are distributed using a smooth distribution method, according to one or more aspects of the various embodiments. As shown in FIG. 3B, a cluster 330 in a mesh network comprises a source node 324 and an N number of nodes neighboring the source node, for example, nodes 320-1 to 320-N. After node 324 receives the dataset, a notification of dataset availability is transmitted to at most two nodes neighboring source node 324 (e.g., 320-1 and 320-2), when two is determined to be the optimal number of floating nodes for each source node determined based on one or more factors (e.g., knowledge of float throughput of devices implementing the nodes in the network, the number of neighbors that can be served simultaneously by a source node, etc.). In other examples, the optimal number of floating nodes can be different, such as three, four, or more. As discussed previously, limiting a number of nodes that can be floated for each source node results in better performance, both at the node level and the network level. For example, limiting a number of floating nodes to two, as shown in FIG. 3B, allows nodes 320-1 and 320-2 to receive the datasets from node 324 faster than nodes 310-1 to 310-4 receive the dataset from node 314 in FIG. 3A.

Figure 4A:
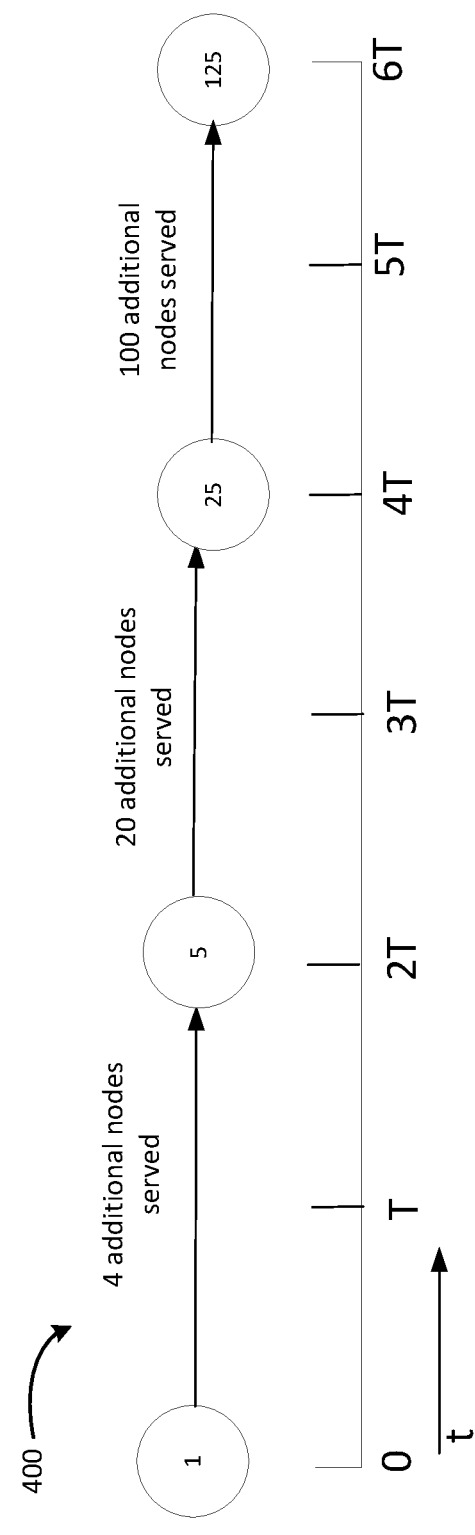
FIG. 4A illustrates an exemplary timeline for a cluster in which datasets are distributed using a conventional viral distribution method.

FIG. 4A illustrates an exemplary timeline for a cluster in which datasets are distributed using a conventional viral distribution method. The timeline 400 is associated with an exemplary cluster in which a source node can establish a connection with a maximum of four neighboring nodes at any given time (e.g., exemplary cluster 308 in FIG. 3A). In this example the source node can establish up to maximum four connections but the maximum throughput may only allow two datasets to be floated in parallel at the faster rate while the remaining datasets take longer. As a result four floating nodes in parallel takes at least a duration of 2T. The slower duration also results from the overuse of the bandwidth which will typically create some packet failures and retries. Failures and retries will get worse if more than four connections are established with the same throughput limitation.

For example, At t=0, the cluster has a single source node (e.g., a seeded node seeded by the back office) as shown in FIG. 4A. At t=2T, a total of five nodes receive the dataset as a result of the single source node transmitting the dataset to four neighboring nodes requesting the dataset from the source node. Each of the five source notes at t=2T can transmit the dataset to an additional four nodes, resulting in an additional twenty nodes being sourced. Accordingly, at time t=4T, a total of twenty five nodes are sourced. Note that because all the resources of a source node are being utilized to transmit the dataset while the source node is also receiving redundant requests from other floating neighboring nodes, a relatively longer time duration of 2T (as compared to the smooth distribution process of FIG. 4B discussed below) is required for a source node to fully transmit the dataset to a neighboring node. Finally, at time t=6T a total of one hundred twenty five nodes have been sourced.

Figure 4B:
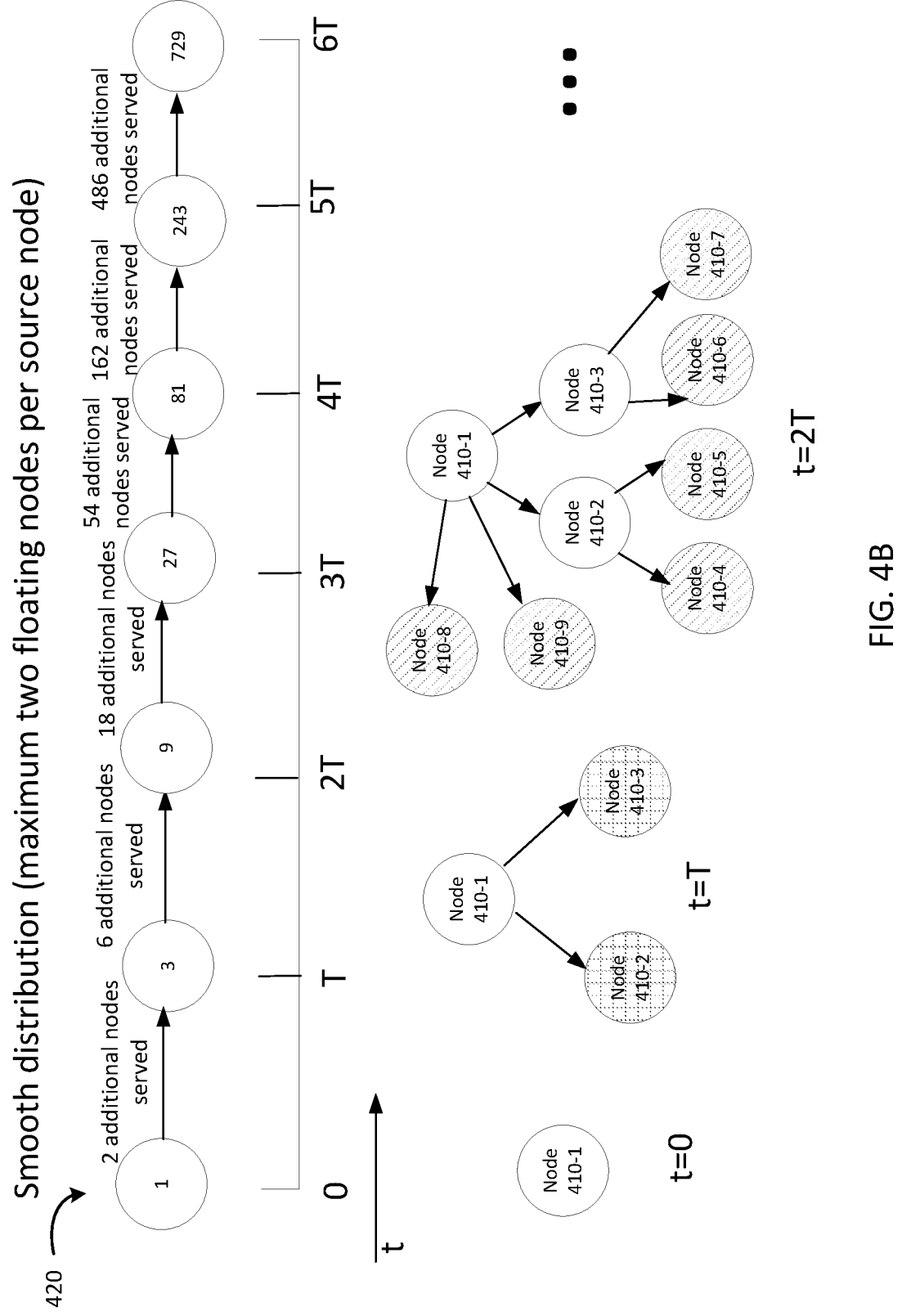
FIG. 4B illustrates an exemplary timeline for a cluster in which datasets are distributed using a smooth distribution method, according to one or more aspects of the various embodiments.

FIG. 4B illustrates an exemplary timeline for a cluster in which datasets are distributed using a smooth distribution method, according to one or more aspects of the various embodiments. In the smooth distribution process, the back office establishes a ceiling for the number of nodes that a source node can connect to for purposes of transmitting the dataset. The timeline 420 is associated with an exemplary cluster in which back office controls the floating process so that each source node establishes a connection with a maximum of two nodes at any given time (e.g., exemplary cluster 308 in FIG. 3A). As mentioned previously, the optimal number of floating nodes is determined based on one or more factors. At t=0, the cluster has a single source node (e.g., source node 410-1) as shown in FIG. 4B.

At t=T, a total of three nodes are sourced as a result of the single source node transmitting the dataset to two neighboring floating nodes (nodes 410-1 to 410-3). Note that because the number of nodes that a source node transmits the dataset to at any given time is limited, the dataset can be transmitted at a faster rate as compared with the conventional viral distribution process of FIG. 4A. As compared with FIG. 4A, the smooth distribution process of FIG. 4B requires a duration of T to fully transmit the dataset from a source node to a floating node. At t=2T, each of the three source nodes has transmitted the dataset to two additional nodes and, accordingly, six additional nodes are added to the set of source nodes (e.g., nodes 410-4 to 410-9). Note that at t=2T, the smooth viral distribution process has transmitted the dataset to a total of nine nodes as compared to conventional the viral distribution process that has only transmitted the dataset to five nodes after the same amount of time. At t=6T, the smooth distribution process can transmit the dataset to a total of seven hundred twenty-nine nodes as compared to the conventional viral distribution process, which can transmit the dataset to a total of one hundred twenty five nodes during the same time duration. Further, it will be appreciated, that the smooth distribution process will experience significantly fewer instances of the back office needing to seed nodes that have timed out, as compared to the conventional viral distribution process.

Figure 5:
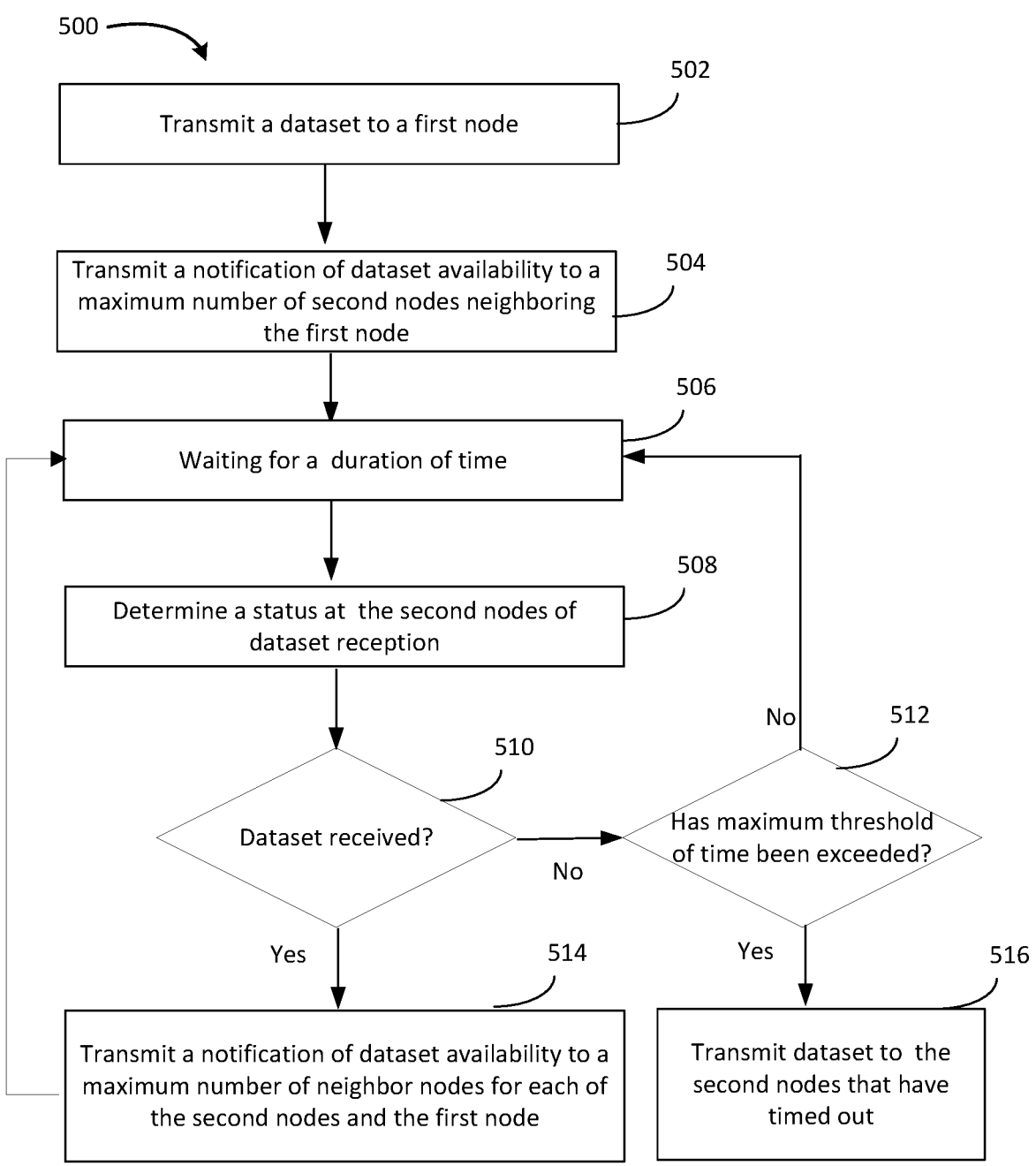
FIG. 5 illustrates a flow diagram of method steps for distributing a dataset to nodes in a mesh network, according to one or more aspects of the various embodiments.

FIG. 5 illustrates a flow diagram of method steps for distributing a dataset to nodes in a mesh network, according to one or more aspects of the various embodiments. The method steps of FIG. 5 can be performed, for example, by the dataset distribution manager 160 of the control center 102 of FIGS. 1-2. At least some of the method steps of FIG. 5 can be performed, for example, during the process 200 of FIG. 2.

As shown, a method 500 begins at step 502, where a dataset distribution manager 160 at a control center 102 transmits a dataset to a first node. In some embodiments, the dataset distribution manager 160 first retrieves a set of neighborhood tables from each node in order to form a network topology map. The transmission can be part of a seeding phase, in which the control center 102 associated with the mesh network selects one or more nodes of the mesh network and transmits the dataset (a firmware image or update file) thereto. In some embodiments, the first node is one of a cluster of nodes, each of which is to eventually receive the dataset. In some embodiments, the dataset is transmitted using a unicast service.

At step 504, the dataset distribution manager 160 transmits a notification of dataset availability to a maximum number of second nodes neighboring the first node. In some embodiments, the control center 102 has access to a network topology map with information regarding neighboring nodes for each node as noted above. In some embodiments, the dataset distribution manager 160 also tracks information regarding which of the nodes in the network have received the dataset. The dataset distribution manager 160 is, therefore, able to determine the neighboring nodes of the first node that have not yet received the dataset. Using this information, the dataset distribution manager 160 can also determine the neighboring nodes of the first node to which the dataset availability notification should be transmitted. Because the number of nodes to which the dataset availability notification is transmitted is capped, the number of nodes to which the notification is transmitted is lower than the total number of neighboring nodes that have not yet received the dataset. As mentioned previously, the maximum number of nodes to receive the notification can be determined based on an optimization criteria. The maximum number of nodes to which the notifications of dataset availability are transmitted for a given source node is typically lower than the total number of available channels on the node (or the maximum bandwidth of the node).

At step 506, the dataset distribution manager 160 waits for a duration of time. During this duration, the nodes to which notifications were sent at step 504 (also known as the floating nodes), can request the dataset from a neighboring source node. In some embodiments, the floating nodes request the dataset from any of the neighboring source nodes. The dataset distribution manager 160 does not require the floating nodes to request the dataset from a specific node. For example, the second nodes that receive the notification can request the dataset from the first node or, alternatively, can request the dataset from a different neighboring node that is sourced.

In some embodiments, the duration of time can be programmed during network configuration. In some embodiments, the duration of time is based on a communication speed of the devices corresponding to the nodes. In some embodiments, the duration of time is determined by the control center 102 based on network performance. For example, the control center 102 can request a status of dataset transmission from multiple nodes throughout the network over a period of time and compute an estimate of an average time duration that is required to transmit a dataset between nodes. Based on this estimate, the control center 102 can compute the amount of time the control center 102 should wait before requesting a status update.

At step 508, the dataset distribution manager 160 determines a status at the second nodes of the dataset reception. For example, a status request is sent to each of the second nodes to determine the status of the second nodes. A status can be determined for each of the second nodes contemporaneously or consecutively.

At step 510, if the dataset distribution manager 160 determines that the dataset at a second node was received, then at step 514 the dataset distribution manager 160 transmits a notification of dataset availability to a maximum number of neighboring nodes for each of the second nodes that has received the dataset and the first node. As explained previously, once a transmission is complete, additional nodes neighboring the newly sourced second nodes and the previously sourced first node can also receive the notifications regarding dataset availability. The process can then continue forward in this way by returning to step 506 to wait for the additional neighboring nodes that received the notification to receive the dataset and repeating the process until all the nodes in the cluster are sourced.

If at step 510, the dataset distribution manager 160 determines that the dataset at a second node was not received, then, at step 512, the dataset distribution manager 160 determines if the maximum threshold of time has exceeded. If the maximum threshold of time has been exceeded, a node can be determined to have timed out. If at step 512, the second node is determined to have timed out, then at step 516, the dataset distribution manager 160 transmits the dataset to the second node directly. The dataset is sent by the dataset distribution manager 160 only to second nodes that have timed out. If, however, at step 512, the maximum threshold of time has not yet elapsed, then the dataset distribution manager continues to wait at step 506. In some embodiments, the dataset distribution manager 160 determines the progress of the second node if the dataset transmission has not yet completed at step 510 and use an estimation of the remaining time to determine the duration of time to wait at step 506.

FIG. 6 illustrates a flow diagram of method steps for receiving a dataset by a node in a mesh network, according to one or more aspects of the various embodiments. The method steps of FIG. 6 can be performed, for example, by the dataset module 150 of FIGS. 1-2. At least some of the method steps of FIG. 6 can be performed, for example, during the process 200 of FIG. 2.

As shown, a method 600 begins at step 602, a node that has not previously been sourced by the back office (e.g., node 106 in FIG. 1) receives a notification of an available dataset at a neighboring node that has previously been sourced or seeded (e.g., node 104 in FIG. 1). The notification from the back office starts a floating process at the node receiving the notification which prompts the node to request the dataset from one or more neighboring nodes.

At step 604, the node receiving the notification (the floating node) determines a first neighboring node with the available dataset. In some embodiments, a data transfer from a neighbor node in the mesh network is not limited to being carried out by a specific neighbor node (e.g., a node seeded by the back office, a neighbor node that replies to a request for the data transfer prior to any other node, etc.). Instead, the neighbor node having the highest quality score is selected for the data transfer, such as a neighbor node that has the best or most reliable link with the requesting node. Further, in some embodiments, over the course of the data transfer, a periodic check is performed to determine whether a neighbor node that has a higher-quality connection is available to complete the data transfer. Examples of functionality that allows a node to request and receive the dataset from a neighboring node with the highest quality score is described in application Ser. No. 17/527,070, entitled, "Peer Selection for Data Distribution in a Mesh Network," filed on Nov. 15, 2021, and which is hereby incorporated by reference in its entirety for all purposes.

At step 606, the node receives the dataset from the first neighboring node with the highest-quality connection.

At step 608, the floating node receives a request from the back office (e.g., control center 102 in FIG. 1) to provide a status of the dataset receipt. In some embodiments, the floated node can be configured to automatically transmit a notification to the control center 102 that the dataset has been received.

At step 610, if the reception of the dataset at the node is not complete, then at step 616, the node transmits a notification to the back office that the transfer is incomplete. Further, the node continues to wait to receive the dataset at step 606. Note that downloading the dataset from the neighboring node and the response to the status request from the back office are independent processes. In other words, if the dataset has not downloaded fully and the node transmits a notification to the control center 102 at step 616, the notification transmittal does not interfere with the download of the dataset, which continues at step 606 uninterrupted.

At step 610, if the reception of the dataset is completed, then at step 612, then the node transmits a notification to the back office that the transfer is completed.

At step 612, the node receives a request for the dataset from a second neighboring node that does not have the dataset. In some embodiments, this request is received in response to the back office sending a notification to the second neighboring node that a dataset is available at a neighboring node.

At step 614, the node, which is now a source node after receiving the dataset, transmits the dataset to the requesting second neighboring mode. Steps 612 and 614 can then be repeated as the node transmits the dataset to additional requesting second neighbor nodes.

FIG. 7 illustrates an exemplary node 700 that can be included in a mesh network and used to implement the techniques discussed above with respect to FIGS. 1-6. In some embodiments, node 700 is suitable for use with any of the nodes 104, 106, 108 and/or 110. Node 700 includes, without limitation, one or more processors 720, one or more input/output (I/O) devices 730, one or more transceivers 760, and a memory 740.

Node 700 is a network device and includes computing device hardware configured to perform various processing operations and execute program code. The node can further include various analog-to-digital and digital-to-analog converters, digital signal processors (DSPs), harmonic oscillators, transceivers, and any other components generally associated with RF-based communication hardware. In various embodiments, node 700 includes a battery (not shown) that supplies power to the various computing device hardware included in node 700.

The one or more processors 720 can include any hardware configured to process data and execute software applications. At least one of the one or more processors 720 can include a real-time clock (RTC) (not shown) according to which processor 720 maintains an estimate of the current time. At least one of the one or more processors 720 executes a dataset module.

The one or more I/O devices 730 include devices configured to receive input, devices configured to provide output, and devices configured to both receive input and provide output. In various embodiments, the one or more I/O devices include a keyboard, a mouse, a joystick, a touchpad, a touchscreen, a microphone, an inertial measurement unit (IMU), a display, a speaker, a haptic generator, or the like. In embodiments where the exemplary node 700 is a utility metering device, the one or more I/O devices can include one or more of a volume measurement unit, a pressure measurement unit, a voltage measurement unit, a current measurement unit, sensors, and the like.

The one or more transceivers 760 can include one more interfaces that are associated with various communication media. In various embodiments, the one or more transceivers include at least one of a radio frequency (RF) interface, an Ethernet interface, a power line communication interface, a WiFi® interface, a Bluetooth® interface, or any other interface associated with a communications protocol.

The memory 740 can be implemented by any technically feasible storage medium, including volatile and/or non-volatile storage media. Memory 740 includes, without limitation, a dataset module 150. Dataset module 150 includes program code that, when executed by the one or more processors 720, performs any of the communications (e.g., message receipts, message transmits, status confirmation responses, data requests) functionality (e.g., transmission, reception) described herein. In various embodiments, the communications functionality includes reception and transmission of datasets and messages over a unicast service, reception of neighboring node information, and/or the like, such as the operations described above in conjunction with FIGS. 1-6.

In various embodiment, memory 740 includes a copy of the neighborhood table 744. As noted above, in various embodiments, each node stores and updates its own copy of the neighborhood table. The information comprises a list of addresses or other identifiers for the neighboring nodes.

FIG. 8 illustrates an exemplary server device 800 that can be included in a mesh network and used to implement the techniques discussed above with respect to FIGS. 1-6. In some embodiments, server device 800 is suitable for use control center 102 of FIG. 1. Server device 800 includes, without limitation, one or more processors 820, one or more input/output (I/O) devices 830, one or more transceivers 860, and a memory 840.

Server device 800 includes computing device hardware configured to perform various processing operations and execute program code. A server device can include a network server, compute server, storage server, web server, etc. The server device can further include various analog-to-digital and digital-to-analog converters, digital signal processors (DSPs), harmonic oscillators, transceivers, and any other components generally associated with RF-based communication hardware.

The one or more processors 820 can include any hardware configured to process data and execute software applications. At least one of the one or more processors 820 can include a real-time clock (RTC) (not shown) according to which processor 820 maintains an estimate of the current time. At least one of the one or more processors 820 executes a dataset distribution manager 160.

The one or more I/O devices 830 include devices configured to receive input, devices configured to provide output, and devices configured to both receive input and provide output. In various embodiments, the one or more I/O devices include a keyboard, a mouse, a joystick, a touchpad, a touchscreen, a microphone, an inertial measurement unit (IMU), a display, a speaker, a haptic generator, or the like.

The one or more transceivers 860 can include one more interfaces that are associated with various communication media. In various embodiments, the one or more transceivers include at least one of a radio frequency (RF) interface, an Ethernet interface, a power line communication interface, a WiFi® interface, a Bluetooth® interface, or any other interface associated with a communications protocol.

The memory 840 can be implemented by any technically feasible storage medium, including volatile and/or non-volatile storage media. Memory 840 includes, without limitation, a dataset distribution manager. Dataset distribution manager 160 includes program code that, when executed by the one or more processors 820, performs any of the communications (e, message receipts, message transmits, status confirmation requests, data transmits) functionality (e.g., transmission, reception) described herein. In various embodiments, the communications functionality includes reception and transmission of datasets and messages over a unicast service and/or the like, such as the operations described above in conjunction with FIGS. 1-6.

In various embodiment, memory 840 includes a network topology map 870. The network topology map 870 contains information regarding each node in the mesh network and neighboring nodes of the respective node. In some embodiments, the network topology map can be populated at network startup. In some embodiments, the topology map can be populated at the start of overall firmware download process by requesting neighborhood tables from all nodes in network. In some embodiments the topology map can be refreshed periodically by neighborhood tables from node in the network, which can be either requested or provided periodically based on configuration settings. The server device 800 can transmit queries to the nodes in the mesh network inquiring about the neighboring nodes for each node. Using this information, a list of addresses or identifiers can be compiled for each node, where each address or identifier is associated with a separate neighboring node. In some embodiments, the network topology map 870 comprises this list of addresses or identifiers for each node and updates the network topology map 870 on a periodic basis. In alternative embodiments, the network topology map 870 is static and is only created and updated during network initiation.

SYSTEM OVERVIEW

Figure 9:
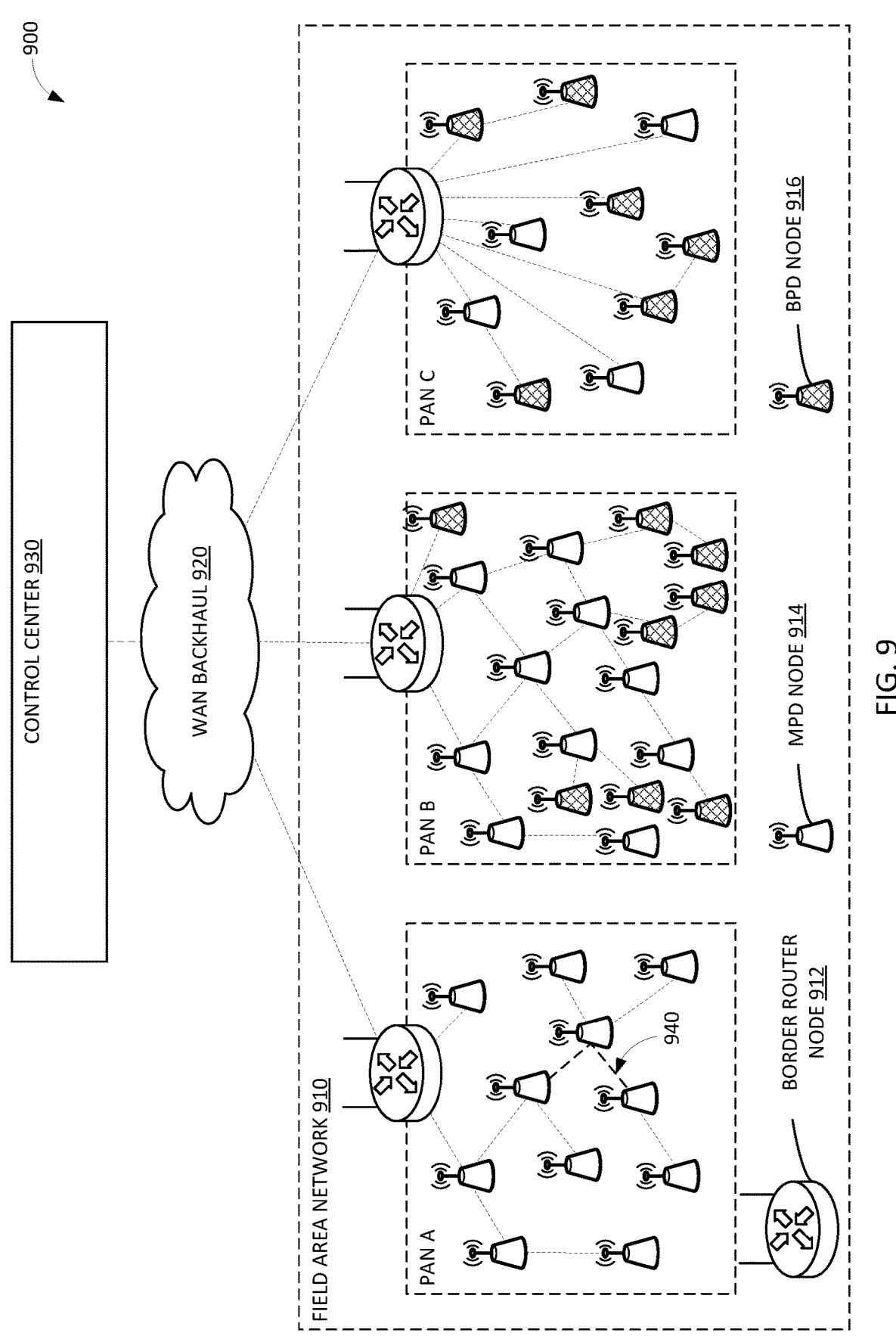
FIG. 9 illustrates a network system configured to implement one or more aspects of the present embodiments.

FIG. 9 illustrates a network system configured to implement one or more aspects of the present embodiments. As shown, network system 900 includes a field area network (FAN) 910, a wide area network (WAN) backhaul 920, a control center 930. FAN 910 is coupled to control center 930 via WAN backhaul 920. Control center 930 is configured to coordinate the operation of FAN 910. Further, control center 930 can be implemented using server device 800.

FAN 910 includes personal area network (PANs) A, B, and C. PANs A and B are organized according to a mesh network topology, while PAN C is organized according to a star network topology. Each of PANs A, B, and C includes at least one border router node 912 and one or more mains-powered device (MPD) nodes 914. PANs B and C further include one or more battery-powered device (BPD) nodes 916. Any of border router node 912, the one or more MPD nodes 914, or the BPD nodes 916 can be used to implement the techniques discussed above with respect to FIGS. 1-6. In various embodiments, nodes 104, 106, 108 and 110 are implemented as node 912, 914, or 916. Further, node device 700 shown in FIG. 7 can be implemented in FAN 910 as any of nodes 912, 914, and/or 916.

MPD nodes 914 draw power from an external power source, such as mains electricity or a power grid. MPD nodes 914 typically operate on a continuous basis without powering down for extended periods of time. BPD nodes 916 draw power from an internal power source, such as a battery. BPD nodes 916 typically operate intermittently and power down, go to very low power mode, for extended periods of time in order to conserve battery power.

MPD nodes 914 and BPD nodes 916 are coupled to, or included within, a utility distribution infrastructure (not shown) that distributes a resource to consumers. MPD nodes 914 and BPD nodes 916 gather sensor data related to the distribution of the resource, process the sensor data, and communicate processing results and other information to control center 930. Border router nodes 912 operate as access points to provide MPD nodes 914 and BPD nodes 916 with access to control center 930.

Any of border router nodes 912, MPD nodes 914, and BPD nodes 916 are configured to communicate directly with one or more adjacent nodes via bi-directional communication links 940. The communication links 940 may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link 940 with the neighboring node. Each neighboring node may update a respective neighbor table to include information concerning the other node, including one or more of the MAC address of the other node, listening schedule information for the other node, a received signal strength indication (RSSI) of the communication link 940 established with that node, and the like.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across WAN backhaul 920 to control center 930. Similarly, control center 930 can transmit data packets across WAN backhaul 920 and across any given PAN to a particular node included therein. As a general matter, numerous routes can exist which traverse any of PANs A, B, and C and include any number of intermediate nodes, thereby allowing any given node or other component within network system 900 to communicate with any other node or component included therein.

Control center 930 includes one or more server machines (not shown) configured to operate as sources for, or destinations of, data packets that traverse within network system 900. The server machines can query nodes within network system 900 to obtain various data, including raw or processed sensor data, power consumption data, node/network throughput data, status information, and so forth. The server machines can also transmit commands and/or program instructions to any node within network system 900 to cause those nodes to perform various operations. In one embodiment, each server machine is a computing device configured to execute, via a processor, a software application stored in a memory to perform various network management operations. In various embodiments, control center 102 can be implemented as control center 930. Further, server device 800 shown in FIG. 8 can be implemented as control center 930 in FIG. 9.

1. According to some embodiments a method comprises transmitting, by a server computing device controlling a mesh network, a dataset to a first node in the mesh network;

transmitting, by the server computing device, first notifications to respective second nodes that are neighbors to the first node in the mesh network, the first notifications informing the respective second nodes that the dataset is available for download; and in response to determining that a third node from the respective second nodes has received the dataset, transmitting, by the server computing device, second notifications to respective fourth nodes that are neighbors to the first node in the mesh network or are neighbors to the third node in the mesh network, the second notifications informing the respective fourth nodes that the dataset is available for download.

2. The method according to clause 1, wherein a number of second nodes receiving the first notifications, a number of fourth nodes neighboring the first node receiving the second notifications, and a number of fourth nodes neighboring the third node receiving the second notifications, are limited to a maximum number.

3. The method according to any of clauses 1-2, wherein the maximum number is based on a throughput of devices implementing nodes in the mesh network.

4. The method according to any of clauses 1-3, wherein the maximum number is based on a number of neighbors to which a node can contemporaneously transmit the dataset.

5. The method according to any of clauses 1-4, wherein the dataset comprises a firmware image, a portion of a firmware image, or configuration data.

6. The method according to any of clauses 1-5, further comprising waiting, by the server computing device, for a duration of time prior to determining that the third node has received the dataset, wherein the duration of time is determined by the server computing device based on a network performance of the mesh network.

7. The method according to any of clauses 1-6, wherein the determining that the third node has received the dataset comprises transmitting a status request to the third node; and receiving a confirmation that the dataset has been received from the third node.

8. The method according to any of clauses 1-7, wherein the first node is randomly selected by the server computing device.

9. The method according to any of clauses 1-8, further comprising determining, by the server computing device based on a network topology map of the mesh network, the respective second nodes to which to transmit the first notifications.

10. The method according to any of clauses 1-9, further comprising waiting, by the server computing device, for a duration of time prior to determining that the third node has received the dataset; and in response to determining that the duration exceeds a threshold amount of time, transmitting the dataset to the third node.

11. According to some embodiments, one or more non-transitory computer-readable media storing instructions which, when executed by one or more processors of a server controlling a mesh network, cause the one or more processors to perform operations comprising sending a dataset to a first node device in the mesh network; sending first notifications to respective second node devices neighboring the first node device in the mesh network, the first notifications instructing the respective second node devices to retrieve the dataset from a neighboring node device; and in response to determining that a third node device from the respective second node devices has received the dataset, sending second notifications to respective fourth node devices that are neighbors to the first node device in the mesh network or are neighbors to the third node device in the mesh network, the second notifications instructing the respective fourth node devices to retrieve the dataset from a neighboring node device.

12. The one or more non-transitory computer-readable media according to clause 11, wherein a number of second node devices receiving the first notifications, a number of fourth node devices neighboring the first node device receiving the second notifications, and a number of fourth node devices neighboring the third node device receiving the second notifications, are limited to a maximum number.

13. The one or more non-transitory computer-readable media according to any of clauses 11-12, wherein the maximum number is based on a throughput of node devices in the mesh network.

14. The one or more non-transitory computer-readable media according to any of clauses 11-13, wherein the maximum number is based on a number of neighbors to which a node can contemporaneously transmit the dataset in the mesh network.

15. The one or more non-transitory computer-readable media according to any of clauses 11-14, wherein the operations further comprise selecting the first node device based on a topology of the mesh network.

16. The one or more non-transitory computer-readable media according to any of clauses 11-15, wherein the operations further comprise determining, based on a topology of the mesh network, the respective second node devices to which to transmit the first notifications.

17. According to some embodiments, a network device in a mesh network, comprises one or more processors; and a memory storing executable instructions that, when executed by the one or more processors, cause the one or more processors to perform operations comprising distributing a dataset to a first device in the mesh network; distributing a maximum number of notifications to respective second devices that are neighbors to the first device in the mesh network, wherein the notifications contain information regarding availability of a dataset at neighboring devices; and in response to determining that a third device from the respective second devices has received the dataset, distributing the maximum number of notifications to respective fourth devices that are neighbors to the first device in the mesh network and the maximum number of notifications to respective fifth devices that are neighbors to the third device in the mesh network.

18. The network device according to clause 17, wherein the dataset comprises a firmware image, a portion of a firmware image, or configuration data for devices in the mesh network.

19. The network device according to any of clauses 17-18, wherein the maximum number is based on at least one of a float throughput of devices in the mesh network or on a number of neighbors to which a device can contemporaneously transmit the dataset in the mesh network.

20. The network device according to any of clauses 17-19, wherein the first device, the respective second devices, and the respective fourth devices are within a same cluster in the mesh network.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:

transmitting, by a server computing device controlling a mesh network, a dataset to a first node in the mesh network;

transmitting, by the server computing device, first notifications to respective second nodes that are neighbors to the first node in the mesh network, the first notifications informing the respective second nodes that the dataset is available for download; and in response to determining that a third node from the respective second nodes has received the dataset, transmitting, by the server computing device, second notifications to respective fourth nodes that are neighbors to the first node in the mesh network or are neighbors to the third node in the mesh network, the second notifications informing the respective fourth nodes that the dataset is available for download from one or more neighbor nodes.

2. The method of claim 1, wherein a number of second nodes receiving the first notifications, a number of fourth nodes neighboring the first node receiving the second notifications, and a number of fourth nodes neighboring the third node receiving the second notifications, are limited to a maximum number.

3. The method of claim 2, wherein the maximum number is based on a throughput of devices implementing nodes in the mesh network.

4. The method of claim 2, wherein the maximum number is based on a number of neighbors to which a node can contemporaneously transmit the dataset.

5. The method of claim 1, wherein the dataset comprises a firmware image, a portion of a firmware image, or configuration data.

6. The method of claim 1, further comprising waiting, by the server computing device, for a duration of time prior to determining that the third node has received the dataset, wherein the duration of time is determined by the server computing device based on a network performance of the mesh network.

7. The method of claim 1, wherein the determining that the third node has received the dataset comprises:

transmitting a status request to the third node; and receiving a confirmation that the dataset has been received from the third node.

8. The method of claim 1, wherein the first node is randomly selected by the server computing device.

9. The method of claim 1, further comprising:

determining, by the server computing device based on a network topology map of the mesh network, the respective second nodes to which to transmit the first notifications.

10. The method of claim 1, further comprising:

waiting, by the server computing device, for a duration of time prior to determining that the third node has received the dataset; and in response to determining that the duration exceeds a threshold amount of time, transmitting the dataset to the third node.

11. One or more non-transitory computer-readable media storing instructions which, when executed by one or more processors of a server controlling a mesh network, cause the one or more processors to perform operations comprising:

sending a dataset to a first node device in the mesh network;

in response to receiving a confirmation of dataset reception from the first node device, sending first notifications to respective second node devices neighboring the first node device in the mesh network, the first notifications instructing the respective second node devices to retrieve the dataset from a neighboring node device; and in response to determining that a third node device from the respective second node devices has received the dataset, sending second notifications to respective fourth node devices that are neighbors to the first node device in the mesh network or are neighbors to the third node device in the mesh network, the second notifications instructing the respective fourth node devices to retrieve the dataset from a neighboring node device.

12. The one or more non-transitory computer-readable media of claim 11, wherein a number of second node devices receiving the first notifications, a number of fourth node devices neighboring the first node device receiving the second notifications, and a number of fourth node devices neighboring the third node device receiving the second notifications, are limited to a maximum number.

13. The one or more non-transitory computer-readable media of claim 12, wherein the maximum number is based on a throughput of node devices in the mesh network.

14. The one or more non-transitory computer-readable media of claim 12, wherein the maximum number is based on a number of neighbors to which a node can contemporaneously transmit the dataset in the mesh network.

15. The one or more non-transitory computer-readable media of claim 11, wherein the operations further comprise selecting the first node device based on a topology of the mesh network.

16. The one or more non-transitory computer-readable media of claim 11, wherein the operations further comprise:

determining, based on a topology of the mesh network, the respective second node devices to which to transmit the first notifications.

17. A network device in a mesh network, comprising:

one or more processors; and a memory storing executable instructions that, when executed by the one or more processors, cause the one or more processors to perform operations comprising:

distributing a dataset to a first device in the mesh network;

distributing a maximum number of first notifications to respective second devices that are neighbors to the first device in the mesh network, wherein the first notifications contain information regarding availability of a dataset at neighboring devices; and in response to determining that a third device from the respective second devices has received the dataset, distributing the maximum number of second notifications to respective fourth devices that are neighbors to the first device in the mesh network and the maximum number of third notifications to respective fifth devices that are neighbors to the third device in the mesh network, wherein the second notifications and the third notifications contain information regarding availability of the dataset at neighboring devices.

18. The network device of claim 17, wherein the dataset comprises a firmware image, a portion of a firmware image, or configuration data for devices in the mesh network.

19. The network device of claim 17, wherein the maximum number is based on at least one of a float throughput of devices in the mesh network or on a number of neighbors to which a device can contemporaneously transmit the dataset in the mesh network.

20. The network device of claim 17, wherein the first device, the respective second devices, and the respective fourth devices are within a same cluster in the mesh network.

* * * * *